United States Patent Office 3,661,892
Patented May 9, 1972

3,661,892
PROCESS FOR THE PRODUCTION OF A NEW
ANTIBIOTIC SF-733 SUBSTANCE
Takashi Shomura and Norio Ezaki, Yokohama-shi, Takashi Tsuruoka and Tomizo Niwa, Kawasaki-shi, Eiichi Akita, Tokyo, and Taro Niida, Yokohama-shi, Japan, assignors to Meiji Seika Kaisha, Ltd., Tokyo, Japan
Filed Dec. 3, 1968, Ser. No. 780,620
Claims priority, application Japan, Dec. 18, 1967, 42/8,060; Oct. 15, 1968, 43/74,634
Int. Cl. C07c 129/18
U.S. Cl. 260—210 R        1 Claim

ABSTRACT OF THE DISCLOSURE

A process for the production of an antibiotic SF-733 substance which comprises cultivating SF-733 strain of *Streptomyces thermoflavus* in an aqueous nutrient medium under submerged aerobic condition and recovering the active ingredient, amorphous free base of SF-733 substance from the medium and more particularly obtaining free base crystal of SF-733 substance by passing said amorphous substance through ethanol-solvate state on the way to crystallization.

This invention relates to a process for the production of a new antibiotic called SF-733 substance which is obtained by cultivating a specific strain selected from the genus Streptomyces.

We have found that an antibiotic which shows a powerful growth preventing action against microorganisms in wide range such as gram positive- and negative-pathogenic bacteria and acid-fast bacteria, is produced in a culture broth of a specific strain belonging to the genus Streptomyces and its active substance may be recovered from the culture broth. We have called this active substance SF-733 substance. In this invention, a strain of Streptomyces which has an activity for producing SF-733 substance in the culture broth in such an extent as is enough to be recovered is employed.

The SF-733 substance-producing microorganism was isolated by the present inventors from a sample of soil collected in Tsu City, MIE Prefecture, Japan and designated *Streptomyces thermoflavus* SF-733 which has been deposited in the American Type Culture Collection, Washington, D.C. under ATCC No. 21294.

Referring to the drawings.

Figure 1:
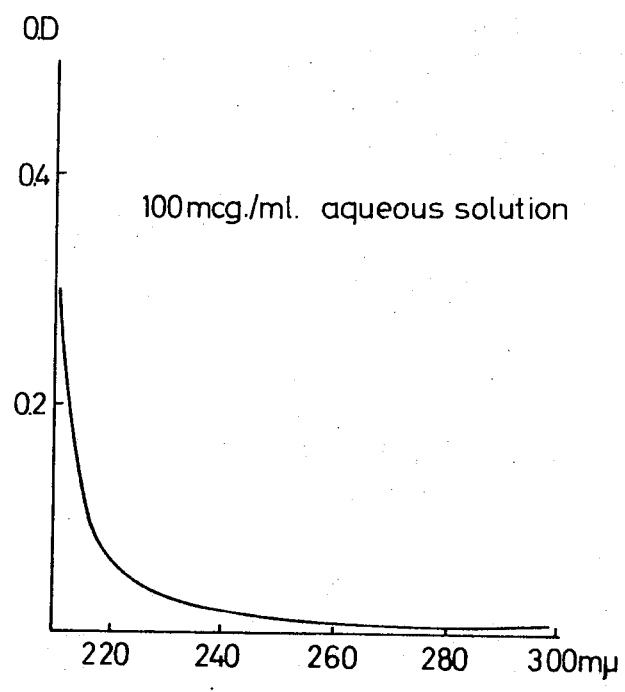
FIG. 1 is ultraviolet spectrum of amorphous SF-733 substance.

*Streptomyces thermoflavus* SF-733 has the following characteristics:

(I) Microscopic observation:
   (1) Aerial mycelium open spiral formed abundantly.
   (2) Spore: oval to elliptical, surface structure is spiny, size is 0.8–1.0 x 1.1–1.4 micron.

(II) Characteristics on various culture media:

| Culture medium | Growth | Aerial mycelium | Soluble pigment |
| --- | --- | --- | --- |
| Sucrose-Czapek agar (incubated at 28° C.) | Thick, good, wrinkled, penetrating into medium. Yellowish cream color, reverse light brownish cream color. | Very scant, light yellowish white | None. |
| Glycerol-Czapek agar (incubated at 28° C.) | Thick, good, wrinkled, penetrating into medium, light yellowish brown. | Scant. White to cream color | Do. |
| Krrinsky's glucose asparagine agar (incubated at 28° C.). | Good, penetrating into medium. Dark cream color, reverse brownish yellow color. | Scant. Cream to light yellowish white color. | Do. |
| Ushinsky's glucose asparagine agar (incubated at 28° C.). | Good, penetrating into medium, brownish yellow color (with greenish tinge). | Abundant, powdery. Greenish yellow, gradually turns from grayish tinge to grayish brown. Greenish yellow patches formed. | Slight yellow. |
| Calcium malate agar (incubated at 28° C.) | No good, light yellowish cream color | Scant. White | None. |
| Glycerol calcium malate agar. (incubated at 28° C.). | Yellow, Colonial | None or scant, light yellow color | Do. |
| Starch synthetic agar (incubated at 28° C.) | Good, penetrating into medium. Yellow central part of colony shows brown (with greenish tinge). | Abundant, powdery, greenish yellow gradually turns to grayish brown color. | Slight yellow. |
| Bouillon agar (incubated at 28° C.) | Colonial, penetrating into medium, dark cream color, reverse brownish yellow color. | None or scant, light yellow color | None. |
| Glucose bouillon agar. (incubated at 28° C.) | Fine wrinkled. Yellowish brown color | Scant, cream color | Do. |
| Potato plug (incubated at 28° C.) | Elevated, fine wrinkled, light brownish cream color. | Scant, whitish gray color | Do. |
| Carrot plug (incubated at 28° C.) | Colonial, dark cream color | None | Do. |
| Tyrosine agar (incubated at 28° C.) | Deeply penetrating into medium, dark cream color. | Gray | Do. |
| Egg (incubated at 37° C.) | Colonial, light brownish yellow color | None | Do. |
| Loeffler coagulated serum (incubated at 37° C.). | Dark brownish yellow color | do | Do. |
| Bacto nitrate broth (incubated at 28° C.) | Sedimented to bottom, colorless | do | Do. |
| Skim milk (incubated at 37° C.) | Yellowish orange ring on surface in contact with glass, sedimented mass on bottom. | do | Light brownish orange color. reaction of medium: pH 5.5. |
| Gelatine stab (incubated at 20° C.) | Colorless to cream color | do | None. |
| Cellulose medium (incubated at 28° C.) | No growth | | |

(III) Physiological properties:
   Production of hydrogen sulfide _____ Negative.
   Production of typrosinase. Do.
   Production of nitrate ____ Positive.
   Coagulation of skimmed milk _____ Negative (28° C., 37° C.).
   Peptonization of skimmed milk _____ Positive (37° C.), negative (28° C.).
   Hydrolysis of starch _____ Positive.
   Liquefaction of gelatine __ Negative.
   Dissolution of Loeffer's coagulated serum _____ Positive (weak, 37° C.).
(IV) Utilization of carbon sources (Pridham-Gottlieb's basal medium, incubated at 27° C.):
   (1) Utilize: arabinose, rhamnose, glucose, mannose, galactose, saccharose, lactose, raffinose, dextrin, Inulin, starch, glycerol, sorbitol, mannitol, maltose.
   (2) Doubtful: inositol, sodium citrate.
   (3) Not utilize: xylose, fructose, dulcitol, sodium acetate, sodium succinate, salicin, cellulose.
(V) Optimum temperature:
   40° C. (measured with temperature gradient incubator).

As described above, the characteristics of the strain SF–733 can be summarized as follows:

Spiral formation in aerial mycelium; spore with spiny structure; cream to yellowish brown growth on synthetic media, yellowish green to grayish brown aerial mycelium, lack of soluble pigment in general but light yellow pigment on glucose-asparagine agar (Ushinsky) and starch synthetic agar cream to yellowish brown growth, thin aerial mycellium and no soluble pigment on organic media. The most distinct characteristic of SF–733 strain is that optimum temperature for growth is rather high as 40° C.

From the characteristics described above, SF–733 strain is deemed to closely relate to flavus series of genus Streptomyces. Namely among this series, *Streptomyces flavus, Streptomyces flaveolus, Streptomyces flavovireus, Streptomyces flavogriseus, Streptomyces alboflavus, Streptomyces parvus, Streptomyces parvullus, Streptomyces kanamyceticus, Streptomyces griseoflavus* and *Streptomyces celluloflavus* may be mentioned as closely related strains. Among these species, *Streptomyces kanamycetius, Streptomyces flavogriseus, Streptomyces alboflavus* and *Streptomyces celluloflavus* are clearly differentiated from SF–733 strain because aerial mecelia of the former form no spiral while one of the latter form abundant typical open spirals. *Streptomyces parvullus* which forms smooth type spore is different from SF–733 strain spore surface of which is spiny. *Streptomyces parvus* and *Streptomyces griseoflavus* are clearly different from SF–733 strain because the former well grows on cellulose medium. *Streptomyces flavus, Streptomyces flaveolus* and *Streptomyces flavireus* which may be said as the typical strains of flavus series are most closely related to SF–733 strain in respect of various characteristics on various culture media.

These three organisms, however, are different from SF–733 strain in respect of following points. Namely *Streptomyces flaveolus* the spores of which are hairy surface is differentiated from SF–733 strain the spores of which are spiny. The aerial mycelia of *Streptomyces flavus* and *Streptomyces flavovireus* are principally straight but in some cases form open spirals while the aerial mycelium of SF–733 strain forms abundant open spirals. In addition thereto *Streptomyces flavovireus* produces greenish yellow soluble pigments on synthetic agar medium while SF–733 strain does not produce soluble pigment. Further, *Streptomyces flavus* does not reduce nitrate and its optimum temperature for cultivation is 25° C. while SF–733 strain produces nitrate and its optimum cultural temperature is rather high as 40° C. As described above, SF–733 strain is clearly different from above three organisms in respect of various important characteristics.

New antibiotic SF–733 substance produced by the SF–733 strain is a typical water-soluble basic antibiotic of wide range of anti-bacterial spectrum, and its optical rotation is (+). Among the known antibiotics, neomycin, paromomycin, kanamycin, gentamicin and tenemycin and the like belong to the same group. The strain SF–733 should be, therefore, compared with above antibiotic-producing strains with respect to their mycological relationship. As gentamicin-producing strain there are two strains, *Micromonospora echinospora* and *Micromonospora purprea*. They are not belonging to Streptomyces so that it is clearly different from SF–733 strain. Further neomycin-producing strain: *Streptomyces fradiae, Streptomyces albogriseolus*, paromomycin-producing strain: *Streptomyces rimosus Forma paromomycinus*, kanamycin-producing strain: *Streptomyces kanamyceticus*, tenemycin producing strain: *Streptomyces tenebrarius* are clearly different from the SF–733 strain in respect of their morphological properties as shown in the following table and therefore they are different organisms from each other.

[Comparison between SF–733 strain and the known species of *Sterptomyces* which produce dextrorotary water-soluble basic antibiotics]

| Antibiotics | Strains | Aerial mycelium | Surface of spore |
| --- | --- | --- | --- |
| SF–733 substance | SF–733 strain | Spiral | Spiny. |
| Neomycin | *Streptomyces fradiae*. | Straight flexible, no spiral. | Smooth. |
|  | *Streptomyces albogriseolus*. | Spiral | Hairy. |
| Paromomycin | *Streptomyces rimosus forma paromomycinus*. | Straight, occasionally open or closed spiral. | Smooth. |
| Kanamycin | *Streptomyces kanamyceticus*. | Straight | Do. |
| Tenemycin [1] | *Streptomyces tenebrarius*. | Spiral | Do. |

[1] (Seventh Inter-science Conference on Antimicrobial Agent and Chemotherapy, 25–27 October, 1967 in Chicago).

As the result of above mycological investigation, we have confirmed that SF–733 strain is a new micro-organism which produces water-soluble basic antibiotic and that in view of taxonomical straindpoint it is a novel strain of flavus series and have named it *Streptomyces thermoflavus* nov. sp. (The properties of the compared species of Streptomyces based upon Waksman: The Actinomycetes, vol. 2, 1961.)

The characisttics of SF–733 strain are liable to vary as is observed with other Sterptomyces. Namely, artificial variants and mutants of SF–733 may be obtained by various known mutagens such as ultraviolet rays, X-ray, high frequency wave, radioactive ray and chemicals. All natural and artificial variants and mutants which belong to *Streptomyces thermoflavus* and have activity producing SF–733 substance may be utilized in this invention.

According to the present invention, SF–733 strain may be cultured in a culture medium containing the nutrients which would be used in cultivation of usual microorganisms. For the nutrients, the known nutrients which are utilized in cultivation of Streptomyces can be used. For example, glucose, starch, glycerol, dextrin, sucrose and the like are useful as the carbon source. Soybean meal, wheat-embryo, meat-extract, peptone, dried yeast, corn steep liquor, distiller's soluble ammonium sulfate, sodium nitrate and the like are useful as the nitrogen source. If necessary, inorganic salts such as calcium carbonate, common salt, potassium chloride, phosphate may be added. In addition, organic and inorganic materials which aid the growth of SF–733 strain and facilitate the production of SF–733 substance can be also added. For the cultivation of SF–733 strain, liquid cultivation, in particular, under submerged aerobic condition is most preferable. Suitable fermentation temperature is 25–40° C. mostly near 35° C. The production of SF–733 substance comes to maximum for 2–5 days in either of shaking culture and tank culture.

For the assay of SF–733, mycinassay agar (pH 7.8) may be used as medium and Bacillus subtilis ATCC No. 6633 as a test organism.

Linear relation between logarithm of concentration of SF–737 substance and diameter of inhibitory ring against test organism was observed at the level of 1–25 mcg./ml. and the values of diameters of inhibitory ring at such condition was 15–25 mm. respectively (up-plate method).

SF–733 substance is a water soluble basic antibiotic as is clear from the physico-chemical properties described below and may be recovered from the cultured broth by every known methods which are generally available for the recovery of the known water soluble basic antibiotics such as kanamycin, neomycin, etc.

SF–733 substance may be more easily adsorbed on active carbon at alkaline side and eluted more efficiently with an aqueous alcohol or aqueous acetone at acidic pH.

SF–733 substance may also be purified with ion exchange resin as an adsorbent. For ion-exchange resin, for example, cation exchange resin such as Amberlite IRC–50 (Rohm & Haas) in $NH_4^+$-, $Na^+$- or $H^+$-type may advantageously be used. The elution is usually made with an aqueous acid, alkali or salt solution. Further, SF–733 subsance may also be efficiently deposited in the form of acid salt by adding water-miscible organic solvent to an aqueous solution of SF–733 substance acid salt.

A crude powder of SF–733 substance thus obtained can be further purified by ion-exchange chromatography with Dowex 1 X2 ($OH^-$ type) (Dow Chemicals) or Amberlite CG–50 ($NH_4^+$ type (Rohm & Haas), whereupon white amorphous powder of free base of SF–733 substance can be obtained the purity and unity of which was ascertained by paper chromatography, high voltage paper electrophoresis and thin layer chromatography of its N-acetyl derivative. The amorphous free base of SF–733 substance is stable in neutral and alkali side but is barely stable in acid side.

Figure 2:
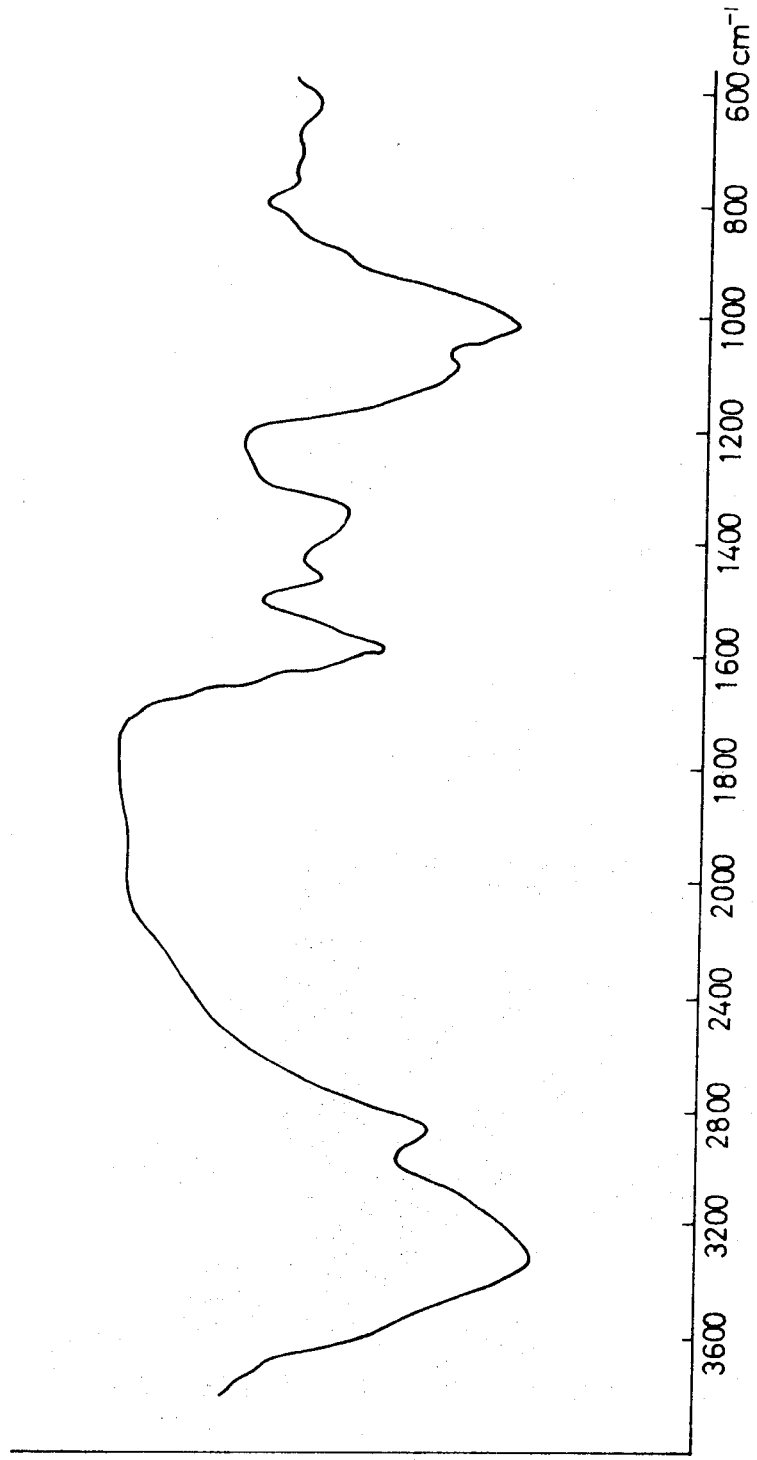
FIG. 2 is infrared spectrum of amorphous SF-733 substance (KBr tablet).

Physico-chemical properties of SF–733 substance are here described. Amorphous free base of SF–733 substance decomposes with effervescence at 178–185° C. and not shows a definite melting point. Said free base is easily soluble in water, a little soluble in methanol and insoluble in organic solvent such as acetone, butanol, ethyl acetate, benzene, hexane, ether. In electrophoresis, it moves at pH 1.8 towards cathode and no existence of acidic groups is detected from titration curve. These facts approve that said free base is a basic substance. Its ultraviolet absorption spectrum is shown in FIG. 1. No specific absorption is observed. Its infrared absorption spectrum is shown in FIG. 2. Absorption band which is peculiar to amino-sugar antibiotics is observed.

The specific optical rotation of SF–733 substance (amorphous free base) in aqueous solution $[\alpha]_D^{23}$ is +42°. The reactions of ninhydrin, Molisch and anthrone are positive, and the reactions of Fehling, Benedict, ferric chloride, maltol, biuret, Tollens and Sakaguchi are negative. The molecular weight estimated by the vapour pressure equillibrium method is 475 which is sustained by the value (452 as tetra acid base) estimated from the titration curve.

The elemental analysis of a sample of SF–733 substance which was dried on phosphorus pentoxide in vacuo at 110° C. for 20 hrs. is as follows: C, 44.16%; H, 7.55%; N, 11.92; O, 36.21% and therefore the molcular formula is $C_{17}H_{34}N_4O_{10}$ (theoretical value: C, 44.93%; H, 7.54%; N, 12.33%, O, 35.20%, molecular weight: 454.49). It has been found from the studies on chemical structure that SF–733 substance has the following chemical structure of O-$\beta$-D-ribofuranosyl-(1→5)-O-$\alpha$-2,6-di- amino - 2,6 - dideoxy-D-glucopyranosyl-(1→4)]-2-deoxy-streptamine.

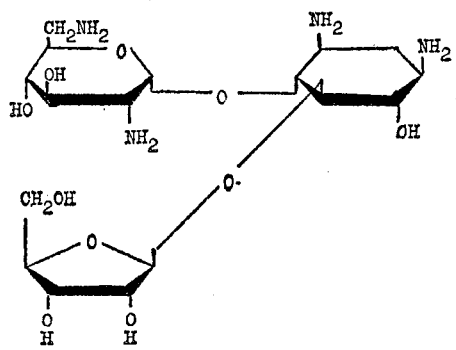

By descending paper chromatography using n-butanol·pyridine·acetis acid·water (6:4:1:3, development for 4 days) and n-butanol saturated with water containing 2% p-toluene sulfonic acid (development for 25 hours), coloration by ninhydrin reaction and bioautography using Bacillus subtilis SF–733 substance shows in each solvent systems a single spot at 8 cm. and 14.8 cm. from original point respectively. In high voltage paper electrophoresis (3300 V, pH 1.8, 15 minutes) also SF–733 substance moves 15 cm. to the cathode and shows a single spot. Further on thin layer chromatography of silica gel using as a developer t-butanol·acetic acid·water (2:1:1), n-butanol·acetic acid·water(3:1:1) and n-butanol·pyridine·water (6:4:3) and 80% aqueous methanol, N-acetyl derivative of SF–733 substance shows a single spot at Rf 0.40, 0.16, 0.50 and 0.70 respectively. This fact also clearly approves the purity and unity of SF–733 substance.

As it is clear from above explanation, SF–733 substance is one of water soluble basic antibiotics and optical rotation thereof is dextro-rotary. Among the known antibiotics neomycin, paromomycin, kanamycin, gentamicin, destomycin, actinospectacin are to be compared with SF-733 substance.

SF–733 substance are compared with these known antibiotics in respect of their optical rotation (Table 1) and paper chromatography (Table 2 and FIG. 3) as follows.

TABLE 1

| Substances | Specific optical rotation (in aqueous solution), deg. | Literatures | Page |
|---|---|---|---|
| SF-733 | +42 | | |
| Neomycin: | | | |
| A | +123 | Umezawa et al., Index of Antibiotics from Actinomycetes (Tokyo University Publishing Society, 1967). | 453 |
| B | +58 | ……do…… | 454 |
| C | +82 | ……do…… | 455 |
| Paromomycin: | | | |
| I | +64 | ……do…… | 492 |
| II | +78 | ……do…… | 492 |
| Kanamycin: | | | |
| A | +121 | Kondo, Journal of Antibiotics series B., 1961. | 262 |
| B | +135 | ……do…… | 262 |
| C | +126 | ……do…… | 262 |
| Gentamicin: | | | |
| A | +146 | Umezawa et al., Index of Antibiotics from Actinomycetes (Tokyo University Publishing Society, 1967). | 308 |
| $C_1$ | +158 | ……do…… | 308 |
| $C_2$ | +160 | ……do…… | 308 |
| Destomycin: | | | |
| A | +7 | ……do…… | 250 |
| B | +6 | ……do…… | 250 |
| Hygromycin B | +19.2 | ……do…… | 335 |
| Actinospectacin | +7.6 | ……do…… | 105 |
| Kasugamycin | +120 | ……do…… | 365 |
| Capreomycin II | +2.5 | ……do…… | 192 |

TABLE 2

| Substances | Solvent B | | Solvent A | |
|---|---|---|---|---|
| | Moving distance from original point (cm.) | R 733 [1] | Moving distance from original point (cm.) | R 733 [1] |
| SF-733 substance base | 8.0 | 1 | 14.8 | 1 |
| Kanamycin: | | | | |
| A base | 8.0 | 1 | 10.0 | 0.68 |
| B base | 6.0 | 0.75 | 18.5 | 1.25 |
| C base | 8.5 | 1.06 | 14.4 | 0.97 |
| Neomycin: | | | | |
| A base | 7.7 | 0.96 | 19.2 | 1.30 |
| B base | 3.4 | 0.43 | 17.6 | 1.18 |
| C base | 3.5 | 0.41 | 17.5 | 1.18 |
| Paromomycin: | | | | |
| I base | 4.1 | 0.56 | 10.8 | 0.73 |
| II base | 4.6 | 0.58 | 10.0 | 0.74 |
| Gentamicin C base | 12.0 | 1.50 | 25.0 | 1.69 |

[1] Ratio of moving distance on the basis of SF-733 substance.

NOTE.—Solvent A: n-butanol saturated with water containing 2% p-toluenesulfonic acid, descending method, development for 25 hours. Solvent B: n-butanol.pyridine.acetic acid.water (6:4:1:3), descending method, development for 4 days. Assay: Bioautography using *Bacillus subtilis*.

Figure 3:
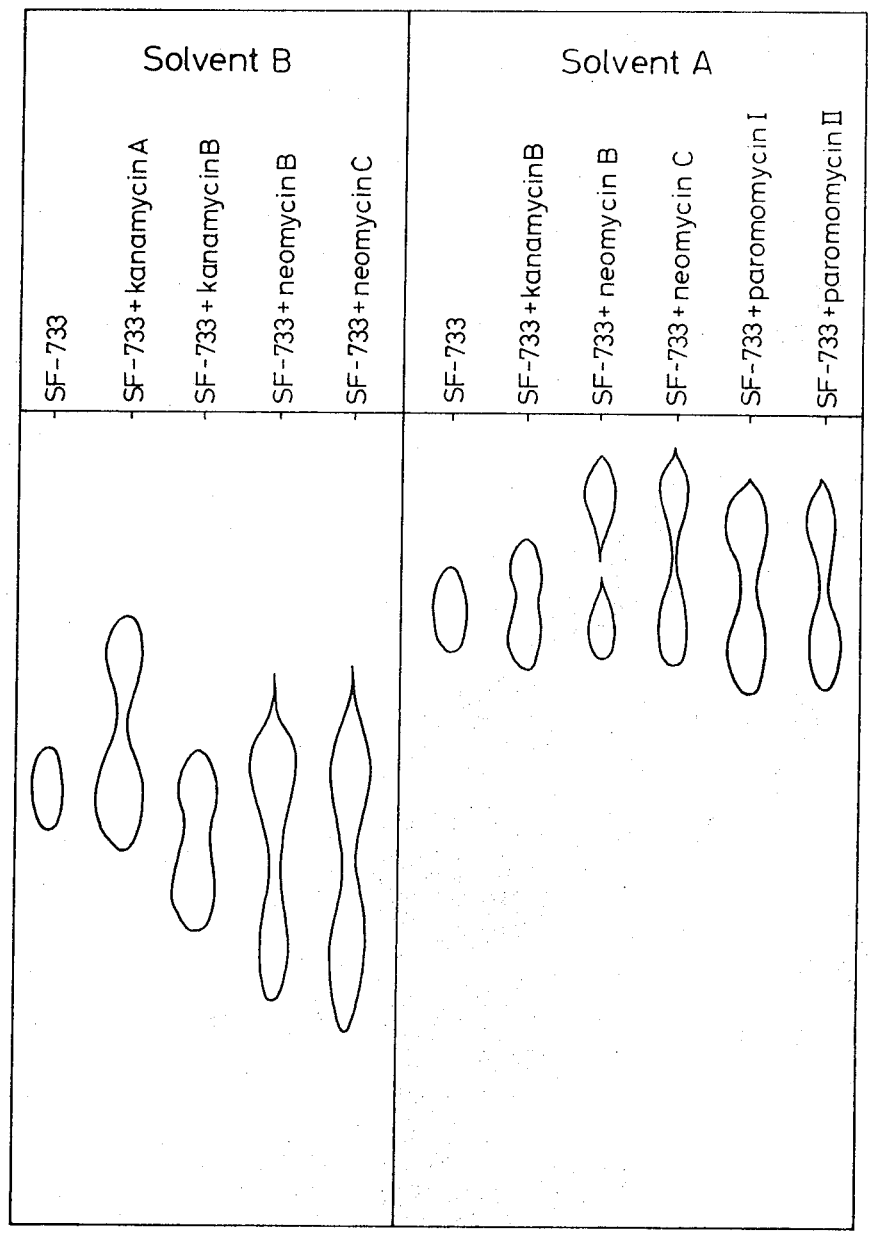
FIG. 3 is paper chromatogram of amorphous SF-733 substance and its related antibiotics.

SF-733 substance may be clearly differentiated from kanamycin group (A, B, C), gentamicin group (A, $C_1$, $C_2$), neomycin A, destomycin A, B, hygromycin B, actinospectacin, kasugamycin and capreomycin with respect to their specific optical rotation in Table 1 and from neomycin B, C, paromomycin I, II, gentamicin C and kanamycin A, B with respect to Rf value on paper chromatogram in Table 2 and FIG. 3. Further, SF-733 substance may be clearly differentiated from capreomycin II which has ultraviolet absorption maximum, from actinospectacin by analytical value of nitrogen, from destomycin A, B and hygromycin B by characteristics of their antibacterial spectrum and their higher toxicity. Furthermore SF-733 substance may be clearly differentiated from tenemycin (Seventh Interscience Conference on Antimicrobialagent and chemotherapy, 1967, from October 25th to 27th day in Chicago) because $[\alpha]_D$ value of N-acetyl derivative of tenemycin is ($+95-+130°$) while that of N-acetyl derivative of SF-733 substance is $+40°$. Thus, it is clear from above comparison that SF-733 substance is a new antibiotic which does not coincide with any known antibiotics.

The antibacterial spectrum of SF-733 substance against various microorganisms is as follows.

Minimum inhibitory concentration by broth dilution method

| Test organisms | Minimum inhibitory concentration (mcg./ml.) | Culture medium |
|---|---|---|
| *Bacillus subtilis* ATCC 6633 | 0.39 | Bouillon medium. |
| *Bacillus cereus* | 6.25 | Do. |
| *Staphylococcus aureus*: | | |
| 209-P | 3.125 | Do. |
| 52-34 | 3.125 | Do. |
| 193 | 3.125 | Do. |
| Smith | 0.39 | Do. |
| Terajima | 0.19 | Do. |
| *Sarcina lutea* | 100.0 | Do. |
| *Aerobacter aerogenes* | 12.5 | Do. |
| *Escherichia coli*: | | |
| IAM 1253 | 12.5 | Do. |
| IAM 1239 | 12.5 | Do. |
| K-12 | 3.125 | Do. |
| Chloramphenicol resistant | 1.56 | Do. |
| Streptomycin resistant | 12.5 | Do. |
| Streptothricin resistant | 50 | Do. |
| Kanamycin resistant | >100 | Do. |
| *Shigella dysenteriae* | 5.25 | Do. |
| *Shigella flexneri* (streptomycin tetracyclin)resistant. | 12.5 | Do. |
| *Salmonella typhi* | 3.125 | Do. |
| *Salmonella typhi paratyphi*: | | |
| A | 12.5 | Do. |
| B | 12.5 | Do. |
| *Klebsiella pneumoniae* | 6.25 | Do. |
| *Proteus vulgaris* | 25.0 | Do. |
| *Pseudomonas aeruginosa* | >100.0 | Do. |
| *Mycobacterium smegmates* 607 | 12.5 | Glycerine bouillon meidum. |
| *Mycobacterium phlei* | 6.25 | Do. |
| *Candida albicans* | >100.0 | Sabouraub. |
| *Torula utilis* | >100.0 | Do. |
| *Saccharomyces cerevisiae* | >100.0 | Do. |
| *Aspergillus niger* | >100.0 | Do. |

As it is clear from above table, SF-733 substance is a wide range active substance which is active to gram positive bacteria, gram negative bacteria and acid past bacteria.

According to tests of acute toxicity by intravenous injection to mice, toxicity of SF-733 substance is very low such as $LD_{50}$ is 1000 mg./kg. of its free base and 500 mg./kg. of its sulfate and no abnormal progress were observed after injection.

Amorphous free base of SF-733 substance may be crystallized by following method.

Amorphous free base is dissolved in water and the solution is concentrated to dryness while adding ethanol and distilling out water by azeotropic distillation, or the solution is first concentrated to syrup and then ethanol is added to form precipitate and concentrated to dryness while further adding ethanol and distilling out water by azeotropic distillation to obtain white solid SF-733 substance in the form of ethanol-solvate. This white solid ethanol-solvate like SF-733 substance is characterized by its higher solubility in methanol than completely dehydrated amorphous free base of SF-733 substance and crystallized free base of SF-733 substance mentioned below.

The white solid ethanol-solvate like SF-733 substance thus obtained is dissolved in appropriate amount of methanol and left it alone whereby crystals are quickly crystallized out. The desired free base crystal of SF-733 substance may be obtained by, for example, recovering the crystals by filtration, washing with a little methanol drying at room temperature in vacuo and further drying in vacuo in a glass desiccator at 60° C. for 19 hours using phosphorus pentoxide as a drying agent, to remove methanol adhered to crystals.

The powder obtained by freeze-drying an aqueous solution of amorphous free base of SF-733 substance and made absorb a suitable amount of water has as higher solubility in methanol as above mentioned white solid ethanol-solvate but even when this powder is dissolved in methanol and left alone, only a small amount of precipitate is formed but no crystals of free base of SF-733 substance can be obtained. Thus for crystallization of free base of SF-733 substance β the present process wherein the material to be crystallized is caused to pass through ethanol-solvate state on the way to crystallization is essential.

The free base crystal of SF-733 substance is white needles or short rods and fuses while decomposing with effervescene at 192–195° C.

The elemental analysis: C, 44.19%; H, 7.39%; N, 11.60%; O (by difference) 36.82%. Molecular weight estimated by the vapour pressure equillibrium method in aqueous solution is 440 and one estimated by the titration method in an aqueous solution is 470. Then the molecular formula of said free base crystal of SF-733 substance is $C_{17}H_{34}N_4O_{10}$ (theoretical value: C, 44.93%; H, 7.54%; N, 12.33%; O, 35.20%; molecular weight 454.49) and has the chemical structure of O-β-D - ribofuramosyl-(1→5)-O-[α-2,6-diamino-2,6-dideoxy-D-glucopyranosyl-(1→4)] - 2 - deoxystreptamine as mentioned above. Namely free base crystal of SF-733 substance is the same compound as amorphous free base of SF-733 substance, and they are different from each other only in the point that they are in different existing states.

The free base crystal of SF-733 substance is dextrorotatory and $[\alpha]_D^{23}$ thereof is $+42°$ (C=1, $H_2O$). An aqueous solution thereof is alkaline. No acid group is detected by analysis of titration curve. Namely the present substance is surely base.

Figure 4:
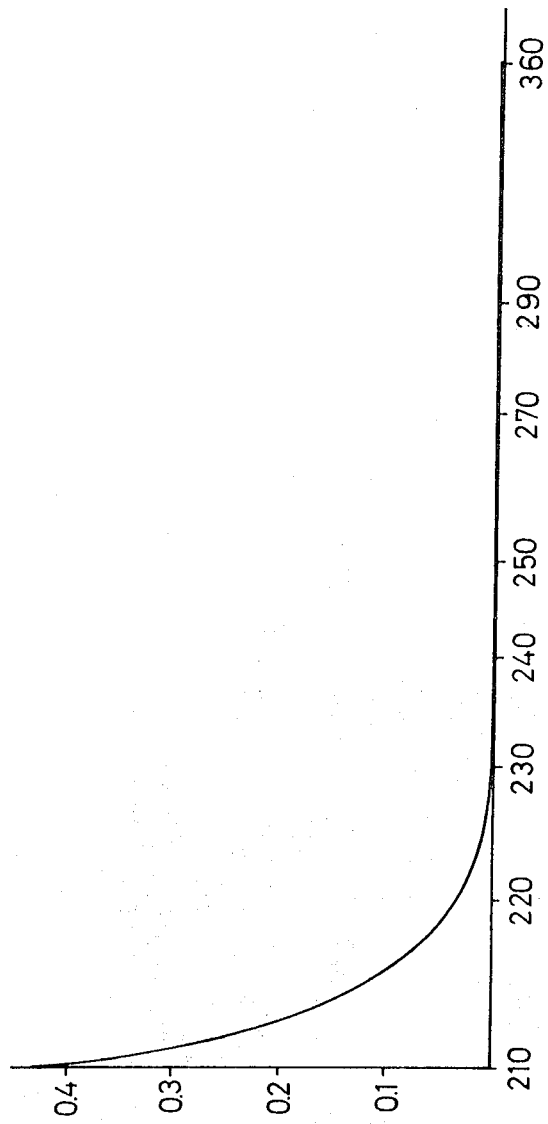
FIG. 4 is ultraviolet spectrum of free base crystal of SF-733 substance.
Figure 5:
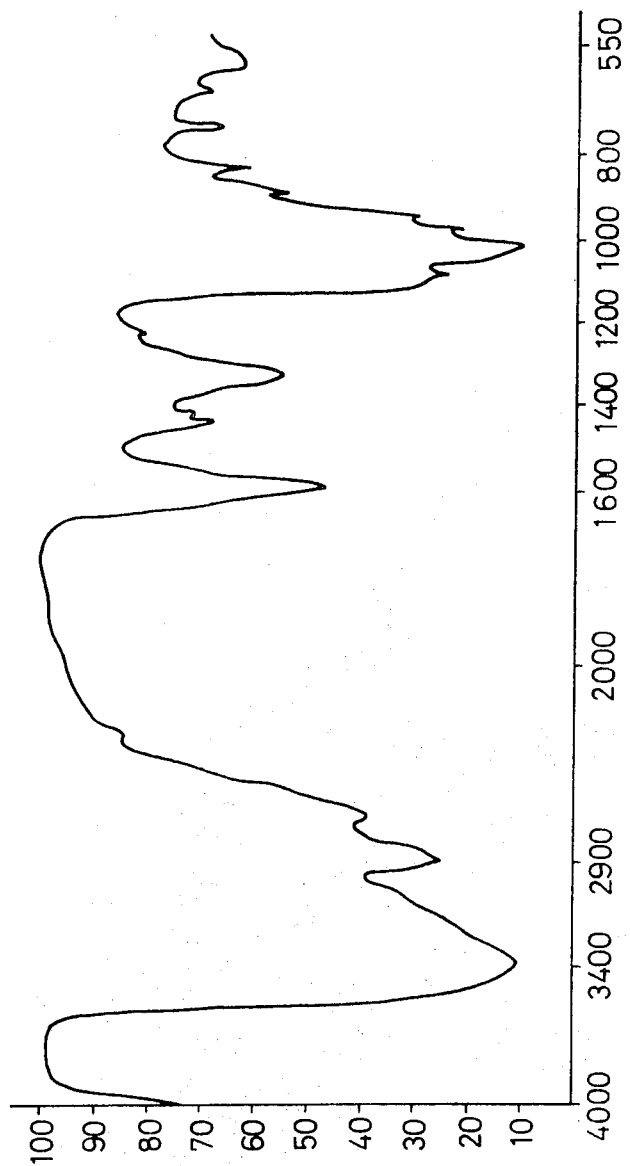
FIG. 5 is infrared spectrum of free base crystal of SF-733 substance.

Ultraviolet spectrum of free base crystal of SF-733 substance in an aqueous solution (0.102%) is shown in FIG. 4. No maximum absorption is observed except end absorption. In the figure, numbers on abscissa represent wavelength (mμ) and numbers on ordinate represent absorbancy. Infrared spectrum of its KBr tablet is shown in FIG. 5. Absorption peculiar to amino-glycosidic antibiotics is observed. In the figure, numbers on abscissa represent wave number per 1 cm. and numbers on ordinate represent transmission degree (%).

The free base crystal of SF-733 substance is easily soluble in water but hardly soluble in methanol and very hardly soluble in ethanol. Further it is almost or entirely insoluble in n-propanol, n-butanol, acetone, ethyl acetate, benzene, petroleum ether and chloroform.

The reactions of Molisch, anthrone, ninhydrin and β-naphthol-sulfuric acid (aldopentose reaction) are positive but the reactions of anthrone under defined condition [hexose, 6-deoxyhexose reactions (Methods of Carbohydrate Chemistry, Vol. I, P. 490, 1963, Academic Press)], Fehling (cool), ferric chloride Brady (reaction with 2,4-dinitrophenylhydrazine), biuret, Sakaguchi, maltol are negative. Free base crystal of SF-733 substance is carbonized by adding concentrated sulfuric acid to an aqueous solution thereof at a room temperature and reduces potassium permanganate solution at a room temperature.

On thin layer chromatography of silica gel G (Merck & Co.) a single spot is detected by ninhydrin coloration or 10% sulfuric acid (carbonize by heating) coloration at almost original point with solvent system of ethanol·conc.ammonia water·water (8:1:1) and of 10% aqueous ammonium acetate solution·methanol (1:1) at Rf value 0.5-0.6 respectively. On paper bioautography using Bacillus subtilis, a single inhibitory spot is detected at 8 cm. and 14.8 cm. from original point with solvent system of n-butanol·pyridine·acetic acid·water (6:4:1:3) (descending, 4 days) and n-butanol saturated with water containing 2% p-toluene sulfonic acid (descending, 25 hours) respectively. In high voltage paper electrophoresis, free base crystal of SF-733 substance moves 15 cm. to the cathode and shows a single spot (3300 v., pH 1.8, 15 minutes, ninhydrin coloration, bioautography with Bacillus subtilis). On thin layer chromatography of silica gel G of N-acetyl derivative of free base of SF-733, a single spot is detected by 10% sulfuric acid (carbonize by heating) coloration at Rf 0.40, 0.16, 0.50 and 0.70 with solvent system of tert-butanol·acetic acid·water (2:1:1), n-butanol·acetic acid·water (3:1:1), n-butanol·pyridine·water (6:4:3) and 80% methanol respectively.

Antibacterial activity of crystallized SF-733 substance and antibacterial spectrum thereof as shown in Table I are the same as those of amorphous SF-733 substance. Further their stability and toxicity are also substantially the same.

The present invention will be explained more in detail by way of following examples.

EXAMPLE 1

Streptomyces thermoflavus SF-733 strain was inoculated to 15 l. of a liquid medium (pH 7.0) containing glucose 2.5%, soybean meal 3.5%, soluble vegetable protein 1.0% and NaCl 0.25% and shake-cultured in a jar-fermenter at 28° C. for 3 days. 10 l. of culture filtrate (potency, 200 mcg./ml.) obtained by filtering culture broth at pH 4.0 was adjusted to pH 7.0 and applied to a column filled with 1 l. of Amberlite IRC 50 (NH$_4^+$ type, Rohm & Haas) to adsorb active ingredient on ion-exchange resin. After washing with water the column was eluted with 0.5 N ammonia water. Active fractions were concentrated in vacuo and freeze-dried. 5.9 g. of crude powder thus obtained was dissolved in 10 ml. of water, applied to a column filled with 400 ml. of Dowex 1 X2 (OH$^-$ type, Dow Chemicals) and developed chromatographically with water to give 250 ml. of active fraction which was concentrated in vacuo, whereby 2.1 g. of light yellow powder of SF-733 substance was obtained.. 2.0 g. of said powder was dissolved in 3 ml. of water, applied to a column filled with 100 ml. of Amberlite CG 50 (NH$_4^-$ type) washed with water and eluted with 0.2 N ammonia water. 400 ml. of active fraction was collected, concentrated in vacuo and freeze-dried to give 600 mg. of white powder of free base of SF-733 substance. This powder was dissolved in about 5 ml. of water and concentrated to syrup and added with about 50 ml. of ethanol. The mother liquor together with white precipitate thus formed was concentrated in vacuo to dryness. 650 mg. of ethanol-solvate like white powder was dissolved in 6.5 ml. of methanol. The solution became cloudy immediately after dissolution and crystals was gradually separated. After tightly sealed and left alone at 30° C. over-night crystal was collected by means of glass filter and washed with about 1 ml. of methanol. The crystal was held on calcium chloride as a drying agent at a room temperature in vacuo and then dried on phosphorous pentoxide as a drying agent at 60° C. for 19 hours in vacuo to give 440 mg. of free base crystals of SF-733 substance. Yield: 73%.

EXAMPLE 2

Streptomyces thermoflavus SF-733 strain was inoculated to 40 l. of a liquid medium (pH 7.0) containing starch 4.0%, soybean meal 2.5%, wheat germ 1.0% and NaCl 0.25% and shake cultured in a jar-fermenter at 35° C. for 2 days. 30 l. of culture filtrate (potency 350 mcg./ml.) obtained by filtering culture broth at pH 9.0 was adjusted to pH 7.0 and applied to a column with filled 3 l. of Amberlite IRC 50 (Na$^+$ type) to adsorb 97% of active ingredient on resin. After washing with water it was eluted with 0.5 N HCl. 6.2 l. of active fraction was neutralized with Amberlite IR 45 (OH$^-$ type) and added with 90 g. of active carbon under stirring to adsorb almost all of active ingredient on active carbon. This active carbon was washed with water and then eluted twice with each 3 l. of 70% aqueous acetone adjusted pH to 2 with hydrochloric acid and the eluate was neutralized, concentrated and freeze-dried. 8.4 g. of crude powder of SF-733 substance hydrochloride was dissolved in 12 ml. of water, applied to a column filled with 700 ml. of Dowex 1 X2 (OH$^-$ type) and developed chromatographically with water. 650 ml. of active fraction was collected, concentrated in vacuo and freeze-dried to give 4.2 g. of light yellow powder of free base of SF-733 substance. 4.1 g. of this powder was dissolved in a small amount of water and applied to a column filled with 100 ml. of Amberlite CG 50 (NH$_4^+$ type) to give 3.4 g. of white powder of free base of SF-733 substance.

Said powder was dissolved in 100 ml. of water, was concentrated in vacuo while adding ethanol and finally water was distilled out by azeotropic distillation. 3.8 g. of white ethanol-solvate like solid was dissolved in 38 ml. of methanol and tightly sealed and left alone at a room temperature over-night to separate crystal. The crystal was collected by filtration, washed with 10 ml. of methanol and dried by a method substantially similar to Example 1 to give 2.4 g. of free base crystals of SF-733 substance. Yield 71%.

EXAMPLE 3

To 10 l. of the culture broth obtained in Example 1 Hyfluosuper cell was added as a filter aid and mycelia were removed by filtration. 8 l. of this filtrate was adjusted to pH 8.5-9.5 and active carbon in an amount (80 g.) corresponding to 1% of the filtrate was added and stirred for 30 minutes whereby almost all of active ingredient was adsorbed to active carbon. The active carbon was collected by filtration, washed with water, suspended in 1.2 l. of 70% aqueous methanol, adjusted pH to 2.0 with 4 N sulfuric acid and stirred for 30 minutes to extract active ingredient. The filtrate after removing active carbon by filtration was concentrated in vacuo and added with acetone whereby 28 g. of crude powder containing SF–733 substance was obtained. It was dissolved in 35 ml. of water, adjusted to pH 4.0–4.5 with 4 N sulfuric acid, applied to a column filled with 35 g. of active carbon powder and eluted with 0.03 N sulfuric acid. 300 ml. of active fraction was collected, adjusted to pH 6.0 with Amberlite IR 45 (OH⁻ type), concentrated in vacuo and freeze-dried to give 6.5 g. of crude powder of SF–733 substance sulfate.

What is claimed is:

1. An antibiotic substance, free base crystal of SF–733 substance which is soluble in water, slightly soluble in methanol, hardly soluble in ethanol, substantially insoluble in n-propanol, n-butanol, acetone, ethyl acetate, benzene, petroleum ether and chloroform, which exhibits no absorption maximum of ultraviolet spectrum, which is white needles or short rods, which fuses while decomposing with effervesrcence at 192–195° C., which gives a positive reaction to Molisch, anthrone, ninhydrin and β-naphthol-sulfuric acid and negative Fehling, ferric chloride, Brady, biuret, Sakaguchi and maltol, elemental analysis of which is C, 44.19%; H, 7.39%; N, 11.60%; O (by difference), 36.28%, molecular formula of which is $C_{17}H_{34}N_4O_{10}$, chemical structure of which is O-β-D-ribofuranosyl-(1→5)-O-[α-2,6-diamino - 2,6 - dideoxy-D-glycopyranosyl-(1→4)]-2-deoxystreptamine,

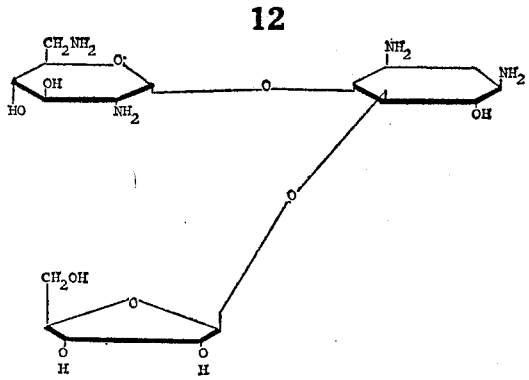

which is dextro-rotatory and exhibits $[\alpha]_D^{23}$ +42° (C=1, $H_2O$).

References Cited

UNITED STATES PATENTS 2,590,831  3/1952  Wolfrom et al. _____ 260—210 S

LEWIS GOTTS, Primary Examiner

J. R. BROWN, Assistant Examiner

U.S. Cl. X.R.

195—80; 260—210 AB